L. G. RILEY.
CONTROL SYSTEM.
APPLICATION FILED MAY 3, 1915.
1,264,335.
Patented Apr. 30, 1918.
2 SHEETS—SHEET 1.
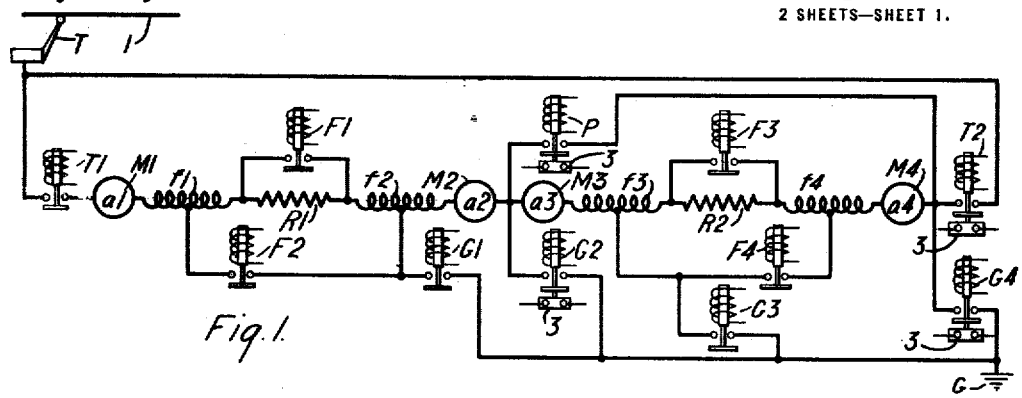
Fig. 1.
Fig. 2.
|   | T1 | T2 | F1 | F2 | F3 | F4 | G1 | G2 | G3 | C4 | P |
|---|----|----|----|----|----|----|----|----|----|----|---|
| 1 | O  |    |    |    |    |    |    |    |    | O  |   |
| 2 | O  | O  | O  |    |    |    |    |    |    | O  |   |
| Trans | O | O | O |  |  |  |  | O | O |  |  |
| 3 | O  | O  | O  |    |    |    |    |    | O  |    |   |
| Trans | O | O | O |  |  |  |  | O | O |  |  |
| 4 | O  | O  | O  |    |    |    |    | O  |    |    |   |
| 5 | O  | O  | O  |    | O  |    |    | O  |    |    |   |
| 6 | O  | O  |    | O  |    | O  |    | O  |    |    |   |
| Trans | O | O |  | O |  | O | O | O | O |  |  |
| 7 | O  | O  |    | O  |    | O  | O  |    | O  |    |   |
| 8 | O  | O  |    | O  |    | O  | O  |    | O  |    | O |
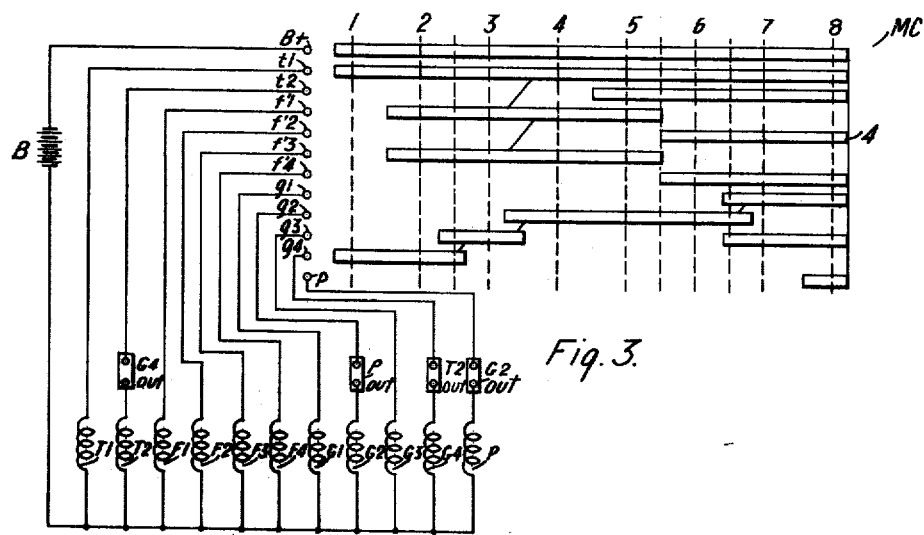
Fig. 3.
WITNESSES:
Fred A. Lind.
D. H. Mace
INVENTOR
Lynn G. Riley
BY
Wesley G. Carr
ATTORNEY

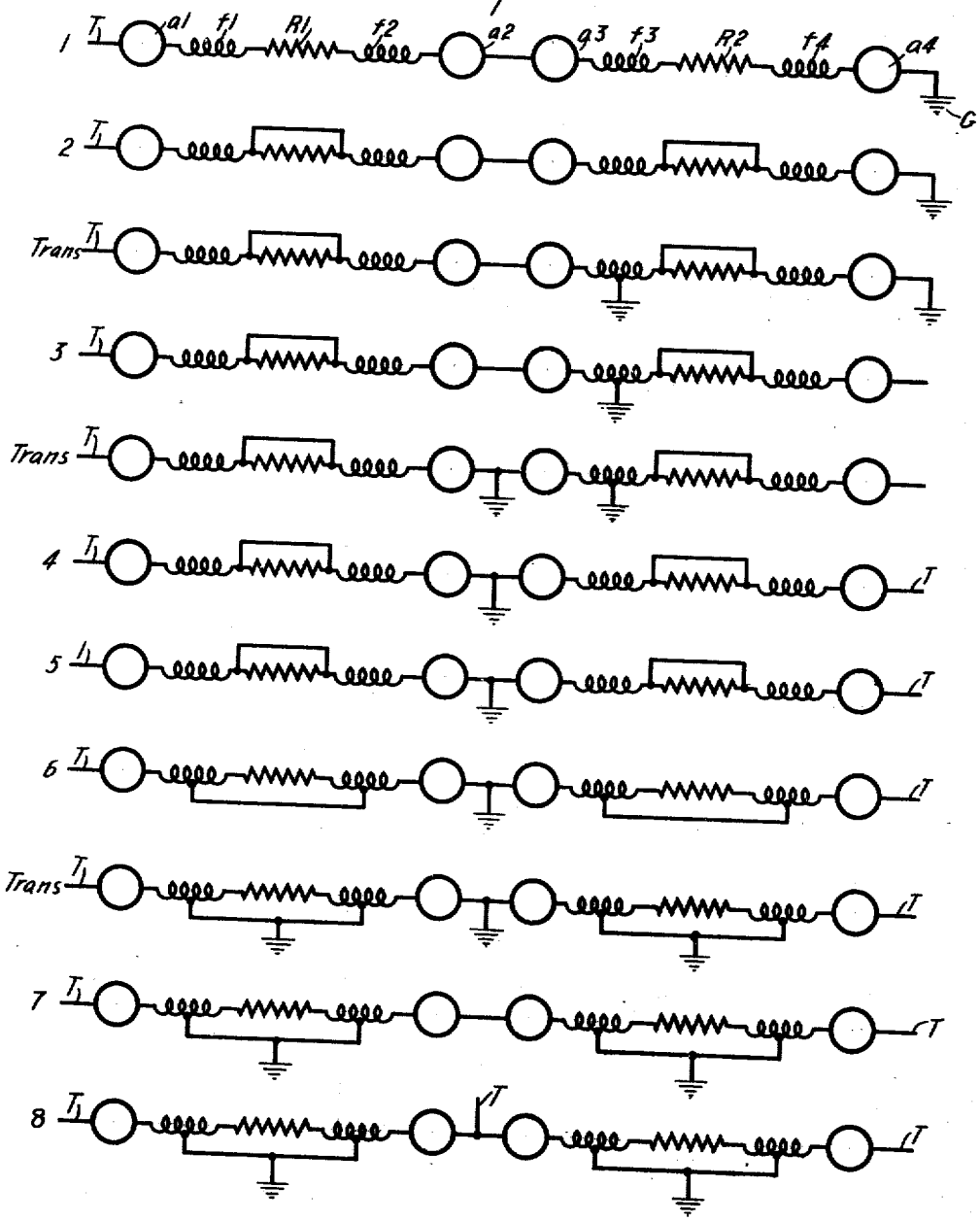

UNITED STATES PATENT OFFICE.

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,264,335.  Specification of Letters Patent.  Patented Apr. 30, 1918.

Application filed May 3, 1915. Serial No. 25,495.

*To all whom it may concern:*

Be it known that I, LYNN G. RILEY, a citizen of the United States, and a resident of Wilkinsburg, in the county of Allegheny and State of Pennsylvania, have invented a new and useful Improvement in Control Systems, of which the following is a specification.

My invention relates to methods of and means for controlling dynamo-electric machines, and it has special reference to the control of so-called four-motor equipments that are adapted for the propulsion of electric railway cars or locomotives.

One of the objects of my invention is to provide an improved and simplified mode and means for controlling the operation of a plurality of electric railway motors or similar driving units, and particularly to make provision for governing the circuit connections of the accelerating resistors and establishing so-called "field-control" connections for the motors, through the agency of a minimum number of switches.

A still further object of my invention is to provide a method and means for controlling the operation of four electric motors that are permanently connected in series-circuit relation, whereby said motors are connected in series-parallel groups and then in full-parallel arrangement, while effecting reversals in the direction of the flow of current through certain of the motors during the operation and also securing "field-control" by suitable adjustments of field-magnet windings.

More specifically stated, it is an object of my invention to subdivide the accelerating resistance of a control system of the above indicated character and to interpose the respective sections between the adjacently disposed field-magnet windings of each pair of driving motors, and, moreover, to provide means for short-circuiting the resistor sections associated with the several pairs of motors and for establishing short-field connections thereof by interconnecting corresponding intermediate points of the adjacent field-magnet windings.

My invention is illustrated in the accompanying drawings, in which Figure 1 is a diagrammatic view of the main circuit connections and main control apparatus of a system of control embodying my invention; Fig. 2 is a sequence chart indicating the positions of the various switches in the different positions of the master controller; Fig. 3 is a diagrammatic view of the auxiliary control-circuit connections and auxiliary apparatus for governing the operation of the main control apparatus in Fig. 1, the auxiliary interlock switches being distributed throughout the diagram without reference to the switches with which they are actually associated; and Fig. 4 embodies simplified diagrammatic views of the main circuit connections of the motors that are established in the different positions of the master controller.

Referring to the drawings, a supply-circuit conductor 1 is adapted to deliver energy to a plurality of electric motors M1, M2, M3 and M4 through a trolley T, a plurality of accelerating resistors R1 and R2, and a plurality of unit switches T1, T2, F1, F2, F3, F4, G1, G2, G3, G4 and P for arranging the motor-circuit connections for series-parallel and full-parallel operation of the driving motors.

The motors M1, M2, M3 and M4 are permanently connected in series-circuit relation and respectively comprise armatures $a1$, $a2$, $a3$ and $a4$ and series field magnet windings $f1$, $f2$, $f3$ and $f4$.

The several unit switches referred to may, of course, be of any suitable construction and, although I have illustrated them as electrically operated switches, they may be, and preferably are, electro-pneumatically actuated devices of any well-known type. Certain of the unit switches above mentioned, embody interlock switches 3 which serve, in conjunction with other parts of the auxiliary control apparatus, for prescribing the sequence of operation of the several unit switches and preventing an improper closure thereof. For the sake of simplicity, I shall hereinafter denote the interlock switches by the reference characters which are applied to the unit switches with which they are associated, together with the word "Out" or "In" which signifies the position of the unit switch in which the interlock switch is closed. For instance, interlock G2—out indicates that the interlock switch 3 of the unit switch G2 is closed in the "Out" position of said unit switch.

The master controller MC, shown in Fig. 3, comprises a movable conducting segment 4 of peculiar configuration which is adapted to coöperatively engage a plurality of stationary contact terminals B+, $t1$, $t2$, $f'1$, $f'2$, $f'3$, $f'4$, $g1$, $g2$, $g3$, $g4$ and $p$ upon the position-indicating lines 1, 2, 3, 4, 5, 6, 7 and 8, whereby energy is supplied from a battery B, or other source of energy, to the energizing coils of the several unit switches, hereinbefore mentioned, in a predetermined order, whereby the sequence of operation thereof is predetermined.

Assuming the circuit connections and pieces of apparatus to be as shown in the figures, the operation of the system is as follows: The master controller MC is first moved into position 1, whereby a circuit is established from the battery B, which includes contact terminal B+ and conducting segment 4, where the circuit divides, one branch including contact terminal $t1$, energizing coil of the unit switch T1 and the battery, and another circuit including contact terminal $g4$, interlock switch T2—out, energizing coil of the unit switch G4 and the battery. The unit switches T1 and G4, therefore, are energized and closed to connect the motors M1, M2, M3 and M4, with full field windings, and resistors R1 and R2 in series circuit between the supply-circuit conductor 1 and the ground G, as shown in step 1 of Fig. 4.

When the master controller MC is moved into its position 2, additional circuits are established from the conducting segment 4, one of which includes contact terminal $f'1$, the energizing coil of the unit switch F1 and the battery, and the other of which includes contact terminal $f'3$, the energizing coil of unit switch F3 and the battery. The switches F1 and F3 are, therefore, energized and closed to establish short-circuit connections around the divided accelerating resistors R1 and R2 and thus connect the ends of the adjacent field-magnet windings $f1$ and $f2$, and $f3$ and $f4$. The connections are shown in step 2 of Fig. 4.

Between position 2 and position 3 of the master controller, a transition notch or step is provided in which the contact terminal $g3$ is energized, whereby the corresponding unit switch G3 is closed to connect an intermediate point in the field-magnet winding $f3$ to the ground G.

In position 3, conducting segment 4 becomes disengaged from the contact terminal $g4$, whence unit switch G4 is deënergized and permitted to open, thereby leaving the motors M1, M2 and M3 in series circuit between the trolley T and ground G, as indicated in step 3 of Fig. 4.

In moving from the position 3 to position 4, the master controller MC establishes another transition connection in which conducting terminal $g2$ is brought into engagement with the conducting segment 4, whereby the corresponding energizing coil of unit switch G2 is supplied with energy through interlock switch P—out.

The switch G2, therefore, is closed to connect a point intermediate the armature $a2$, $a3$ to the ground.

When the controller MC reaches position 4, however, the conducting segment 4 is disengaged from the contact terminal $g3$ and, therefore, the unit switch G3 is deënergized and permitted to open. Motors M1 and M2, therefore, are connected in series relation, with full field windings across the supply circuit, while motors M3 and M4 are inactive. (See step 4 of Fig. 4).

When the master controller MC is moved to position 5, a circuit is completed which includes contact terminal $t2$, interlock switch G4—out and energizing coil of switch T2 to the battery. The unit switch T2, therefore, is energized and closed to connect the supply circuit conductor 1 or trolley T to the extreme end of the motor M4. Since the other circuit connections remain unchanged, the motors M1, M2, M3 and M4 are connected in a series-parallel group, with full field windings, as shown in step 5 of Fig. 4.

Between positions 5 and 6, contact terminals $f'1$ and $f'3$ become disengaged from conducting segment 4, while contact terminals $f'2$ and $f'4$ are concurrently brought into engagement therewith. Hence, the corresponding unit switches F1 and F3 are deënergized and opened, while the unit switches F2 and F4 are energized and closed. In position 6, therefore, the corresponding intermediate points of the adjacently disposed pairs of field-magnet windings are interconnected, while the short-circuit connections directly around the resistors R1 and R2 are interrupted. The several motors M1, M2, M3 and M4 are thereby adapted for short-field windings, a portion of their field windings, as well as the interposed resistors, being short-circuited. The motor circuit connections are shown in step 6 of Fig. 4.

In the transition between positions 6 and 7, contact terminals $g1$ and $g3$ become energized and their corresponding switches G1 and G3 are closed. Thus, the short-circuiting interconnections around the resistors R1 and R2 and a portion of the adjacent field-magnet windings, are connected to the ground G through the respective switches G1 and G3.

As soon, however, as the master controller MC occupies its position 7, the conducting segment 4 is disengaged from contact terminal $g2$, and the switch G2 is thereby deënergized and permitted to open, whereby the mid-point intermediate the motors M2 and M3 is disconnected from the ground, as shown in step 7 of Fig. 4. Obviously, in this position, the motors M1 and M4 only are active and said motors are connected in multiple relation. Motors M2 and M3 are short-circuited upon themselves through the ground G.

The master controller MC is then moved into position 8, in which contact terminal $p$ is engaged by conducting segment 4, and the corresponding unit switch P is energized through interlock switch G2—out. The switch P, therefore, is closed and connects the mid-point between the motors M2 and M3 directly to the trolley supply circuit, thereby establishing full-parallel motor circuit connections for the several motors, said motors being connected for short-field magnet windings, in the manner hereinbefore described. The circuit connections are shown in step 8 of Fig. 4.

Various modifications in the circuit connections and mode of operation may be effected without departing from the spirit and scope of my invention and I desire, therefore, that only such limitations shall be imposed as are indicated in the appended claims.

I claim as my invention:

1. In a system of control, the combination with a supply circuit and a plurality of pairs of dynamo-electric machines, said machines being connected in series relation across said circuit and having armatures and field-magnet windings, the field-magnet windings of each pair of machines being adjacently disposed, of means for interconnecting corresponding intermediate points in the field-magnet windings of each pair of machines.

2. In a system of control, the combination with a supply circuit and a plurality of dynamo-electric machines connected in series-circuit relation and adapted to receive energy therefrom, said machines having armatures and field-magnet windings, of a resistor connected in series circuit intermediate said machines, and means for short-circuiting said resistor and for interconnecting corresponding intermediate points of the field-magnet windings.

3. In a system of control, the combination with a supply circuit and two pairs of electric motors connected in series-circuit relation and each having an armature and a field-magnet winding, the field-magnet windings of each pair of motors being adjacently disposed, of resistors interposed between the field-magnet windings of each pair of motors, and means for bridging said resistors and interconnecting corresponding intermediate points of the adjacently disposed field-magnet windings.

4. In a system of control, the combination with a supply circuit and a plurality of series-related electric motors each comprising an armature and a field-magnet winding, the field-magnet windings being adjacently disposed, of a resistor interposed between said motors and in series therewith, and common means for excluding said resistor and for concurrently effecting adjustments of the connections to the field-magnet windings.

5. In a system of control, the combination with a supply circuit and a pair of electric motors connected in a series group and each having an armature and a field-magnet winding, said windings being adjacently disposed, of a resistor interposed between said field-magnet windings and connected in series relation therewith, and switches and circuit connections for either short-circuiting said resistor or short-circuiting said resistor and a portion of each of the adjacently disposed field-magnet windings.

6. In a system of control, the combination with a supply circuit, a plurality of electric motors having armature and field magnet windings, and an accelerating resistor, of means including two switches for connecting said motors for either full-field windings or short-field windings and for concurrently excluding said resistor from circuit.

7. In a system of control, the combination with a supply circuit and two pairs of electric motors normally connected in series-circuit relation and each having an armature and a field-magnet winding, the field-magnet windings of each pair of motors being adjacently disposed, of means associated with each pair of adjacent field-magnet windings for establishing short-field connections or full-field connections of the respective pairs of motors.

8. In a system of control, the combination with a supply circuit, four series-connected electric motors arranged in pairs and each having an armature and a field-magnet winding, the field-magnet windings of the several pairs being adjacently disposed, and resistors disposed intermediate the respective adjacent field-magnet windings and in series with said motors, of control apparatus and circuit connections for excluding said resistors from circuit, then successively cutting out two of said motors, then connecting all of the motors in a series-parallel group, then establishing short-field connections for the several pairs of motors, and finally connecting all four motors in full-parallel relation with short-field connections.

9. In a system of control, the combination with a supply circuit, four normally series-connected electric motors, each having an armature and a field-magnet winding, said motors being connected in pairs and each pair having their field-magnet windings adjacently disposed, of control apparatus and circuit connections for connecting the several pairs of motors for full-field windings or short-field windings, and means for connecting said motors in a series-parallel group and in full-parallel relation, said means coöperating with said field-adjusting means.

10. The method of controlling a plurality of series-connected electric motors having a resistor interposed between them, which consists in excluding said resistor, then excluding portions of the field windings of each motor, and then connecting the adjacent ends of the field windings, and the opposite terminals of the motors to the respective terminals of a source of energy.

11. The method of controlling a pair of series-connected electric motors having armatures and field-magnet windings and a common resistor interposed between said motors, which consists in establishing a short-circuit connection around said resistor and thereby interconnecting the adjacent ends of the field-magnet windings, then establishing a circuit connection between corresponding intermediate points of said field windings, whereby portions of said windings are also excluded from circuit, and, finally, connecting the last mentioned circuit connection and the respective opposite terminals of said motors to the respective terminals of a source of energy, whereby the motors are connected in parallel relation, and a reversal of current in one of the motors is effected.

12. The method of controlling four electric motors permanently connected in series-circuit relation and arranged in pairs, each pair having their field-magnet windings adjacently disposed, which consists in successively cutting out two of the motors, then connecting all four motors in a series-parallel group, then interconnecting corresponding intermediate points of the adjacent field windings of each pair of motors, and then connecting the respective end terminals and the mid-point of the group of permanently series-connected motors, and the interconnecting field connections to the respective terminals of a source of energy, whereby the motors are arranged for full-parallel operation.

13. In a system of control, the combination with a supply-circuit, a plurality of electric motors connected in series-circuit relation and having armature and field-magnet windings, the field-magnet windings being adjacently disposed, and a resistor disposed between said field-magnet windings, of means for simultaneously excluding said resistor and adjusting the short-circuit connections of said field-magnet windings.

14. In a system of control, the combination with a supply-circuit, a plurality of electric motors connected in series relation and having armature and field-magnet windings, the field-magnet windings being adjacently disposed, and a resistor disposed between said field-magnet windings, of a switch for short-circuiting said resistor, and a second switch for establishing a short-circuit around said resistor and portions of said field windings.

15. In a system of control, the combination with a supply-circuit and a plurality of pair of motors, said motors being connected in series relation across said supply-circuit and having armature and field-magnet windings, the field-magnet windings of each pair of motors being adjacently disposed, and a resistor disposed between the field windings of each pair of motors, of means for connecting corresponding intermediate points in the field-magnet windings of each pair of motors.

In testimony whereof, I have hereunto subscribed my name this 28th day of April 1915.

LYNN G. RILEY.

Copies of this patent may be obtained for five cents each, by addressing the "Commissioner of Patents, Washington, D. C."